United States Patent [19]

Steinback

[11] Patent Number: 4,718,130
[45] Date of Patent: Jan. 12, 1988

[54] INTERDOME ENCLOSURE SYSTEM FOR A HEATED SWIMMING POOL

[75] Inventor: Tim J. Steinback, Apollo, Pa.
[73] Assignee: Interpools Systems, Inc., Apollo, Pa.
[21] Appl. No.: 936,911
[22] Filed: Nov. 19, 1986

Related U.S. Application Data

[62] Division of Ser. No. 645,951, Aug. 31, 1984, abandoned.

[51] Int. Cl.⁴ .................. E04H 3/19; E04H 3/18; E04B 1/34; F24H 3/02
[52] U.S. Cl. .................. 4/499; 4/493; 52/2; 165/46; 165/54; 47/7
[58] Field of Search .......... 52/2; 4/498, 499, 494, 4/503, 493; 98/1.5, 33.1; 165/46, 54, 909; 47/7

[56] References Cited

U.S. PATENT DOCUMENTS

| | | | |
|---|---|---|---|
| 2,488,333 | 11/1949 | Schlachter | 165/54 |
| 2,938,714 | 5/1960 | Gerrish | 165/54 |
| 2,996,729 | 8/1961 | Bailey | 4/172 |
| 3,080,875 | 3/1963 | Bartlett | 47/17 |
| 3,124,903 | 3/1964 | Truhan | 47/17 |
| 3,424,179 | 1/1969 | Minot | 135/3 |
| 3,443,265 | 5/1969 | Hauck | 4/172 |
| 3,469,587 | 9/1969 | Folkes | 135/1 |
| 3,534,412 | 10/1970 | Crook | 4/172.12 |
| 3,601,184 | 8/1971 | Hauville | 165/54 |
| 3,662,410 | 5/1972 | Lankheet | 4/172.12 |
| 3,766,573 | 10/1973 | Burkholz et al. | 4/172.12 |
| 3,810,327 | 5/1974 | Giansante | 47/17 |
| 3,855,643 | 12/1974 | Sanford et al. | 4/172.12 |
| 3,869,827 | 3/1975 | Anderson et al. | 47/17 |
| 3,910,490 | 10/1975 | Saypalia, Jr. | 237/1 A |
| 4,024,803 | 5/1977 | Linecker | 98/33 R |
| 4,160,523 | 7/1979 | Stevens | 237/1 A |
| 4,176,653 | 12/1979 | Pittman | 126/428 |
| 4,183,184 | 1/1980 | Sargent | 52/2 |
| 4,246,663 | 1/1981 | Aragona et al. | 4/500 |
| 4,257,132 | 3/1981 | Kerby | 4/498 |
| 4,265,300 | 5/1981 | Kurimoto | 47/17 |
| 4,305,235 | 12/1981 | Roston | 52/2 |
| 4,313,420 | 2/1982 | Poeschl | 126/49 |
| 4,387,533 | 6/1983 | Green et al. | 47/17 |
| 4,512,393 | 4/1985 | Maendel | 165/54 |
| 4,567,696 | 2/1986 | Malet | 52/2 |

FOREIGN PATENT DOCUMENTS

| | | | |
|---|---|---|---|
| 2019882 | 11/1971 | Fed. Rep. of Germany | 52/2 |
| 2042114 | 6/1972 | Fed. Rep. of Germany | 52/2 |
| 2058162 | 7/1972 | Fed. Rep. of Germany | 52/2 |
| 2240122 | 3/1974 | Fed. Rep. of Germany | 165/DIG. 12 |
| 2522917 | 11/1976 | Fed. Rep. of Germany | 52/2 |
| 2556630 | 6/1977 | Fed. Rep. of Germany | 165/DIG. 12 |

OTHER PUBLICATIONS

*Ashrae Handbook* 1984 Systems Volume, Ashrae, Inc., Atlanta, GA, p. 23, 1984.

Primary Examiner—William R. Cline
Assistant Examiner—John K. Ford
Attorney, Agent, or Firm—Michael R. Swartz; John R. Flanagan

[57] ABSTRACT

An interdome enclosure system takes advantage of the latent heat of condensation for energy efficiency. The system includes, in combination with a humid environment, such as a heated pool and an outer enclosure housing the pool, an inner enclosure disposed within the outer enclosure and over the pool and a differntial fan operated heat exchanger for creating an atmospheric pressure within the space between the inner and outer enclosures which is positive relative to the atmospheric pressure within the inner enclosure. The heat exchanger includes a pair of conduits disposed in heat exchange relationship to one another. Assisted by an inlet fan, one conduit communicates dry, fresh cool air from the exterior of the outer enclosure into the space between the enclosures, while the other conduit, assisted by an exhaust fan, communicates moisture-laden, warm air from the inner enclosure directly to the exterior of the outer enclosure.

10 Claims, 4 Drawing Figures

U.S. Patent   Jan. 12, 1988   Sheet 1 of 2   4,718,130
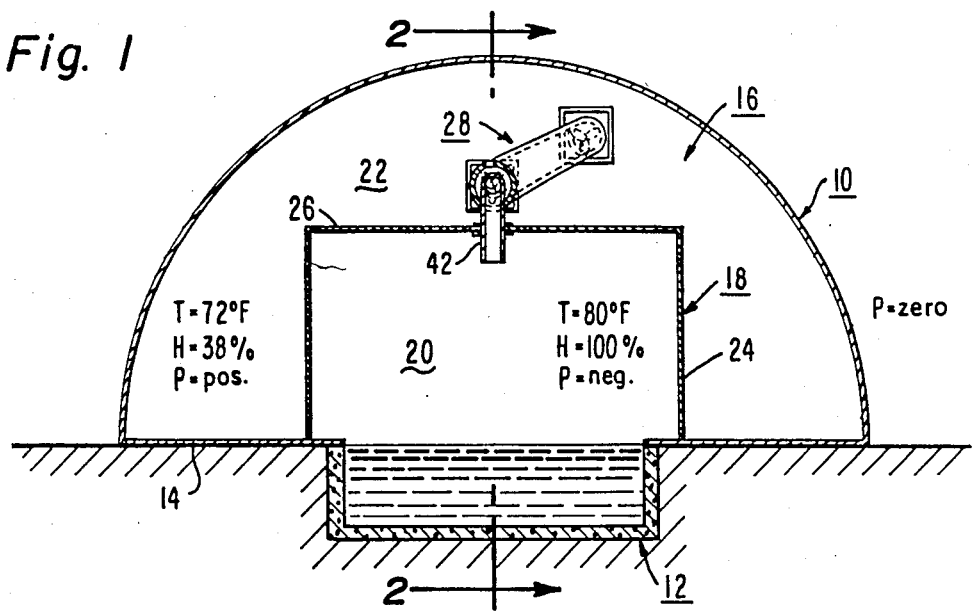
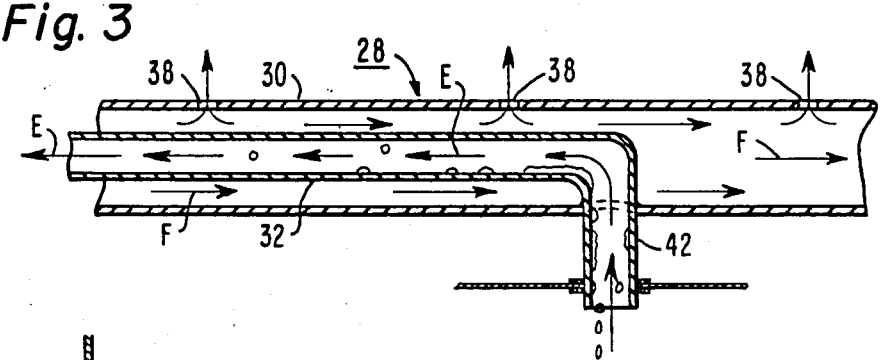
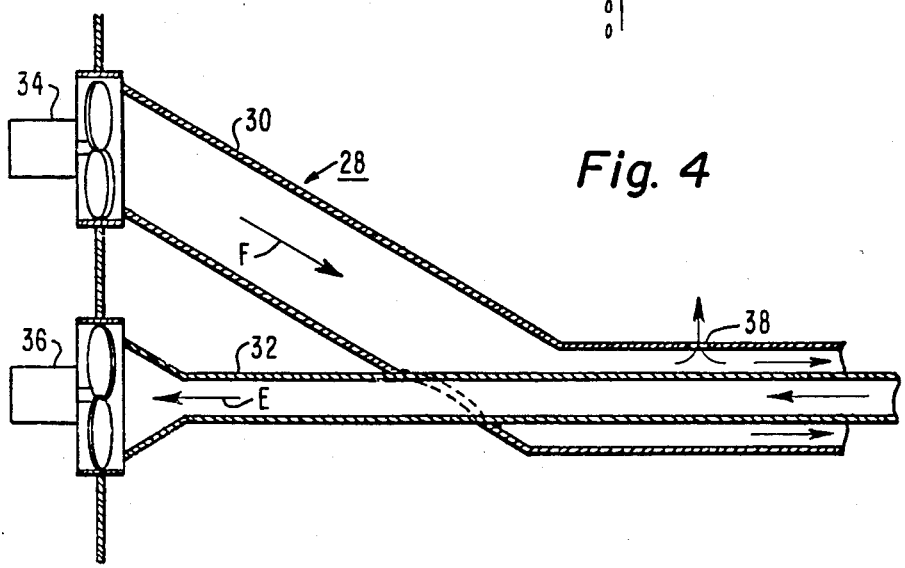

INTERDOME ENCLOSURE SYSTEM FOR A HEATED SWIMMING POOL

This is a division of co-pending application Ser. No. 645,951, filed on Aug. 31, 1984, now abandoned.

BACKGROUND OF THE INVENTION

1. Field of the Invention

The present invention relates generally to enclosures designed for a humid environment, such as a heated indoor swimming pool and, more particularly, is concerned with an interdome enclosure system which enhances moisture control and energy conservation.

2. Description of the Prior Art

Two problems normally associated with enclosing a heated indoor swimming pool are moisture condensation and heat containment. Moisture condensation accumulated on the interior surfaces of the enclosure may eventually result in rotting or rusting of frame members, peeling of paint, and staining of interior walls and ceilings. Inadequate containment of moisture and heat to the vicinity of the pool results in the pool serving as a heating source for the enclosure and possibly the external atmosphere. Little enjoyment is to be gained from having a heated pool when it is accompanied by high energy usage costs. The same problems apply when the humid environment is something other than a heated indoor pool, such as a greenhouse.

However, designing an enclosure for a heated pool which takes both problems into consideration poses a dilemma in that a design which provides a feasible solution to one of the problems tends to aggravate the other. For instance, on the one hand, condensation is minimal where the enclosure is large, spacious and not so tightly built; but, in that case, loss of heat is high. On the other hand, where the enclosure is small, compact and much more tightly built, heat loss is confined to a minimum; however, moisture vapor tends to build up to a higher humidity level faster and creates a severe condensation problem.

As a consequence of this design dilemma, it would appear that the only recourse for the designer is to hope to settle on an enclosure design solution which strikes a reasonable compromise between these competing problems. In other words, as in many other areas of building construction, tradeoffs would seem to be necessary. However, the normal tendency of designs which uncritically accept this state of affairs is to fail to provide a solution to either problem at a cost which is within the reach of the ordinary consumer desiring to have a heated indoor pool. Thus, a need exists for a heated indoor pool enclosure design which challenges these conventional assumptions and makes an indoor heated pool an economically viable choice among recreational alternatives open to the ordinary consumer.

SUMMARY OF THE INVENTION

The present invention provides an interdome enclosure system for a humid environment, such as a heated swimming, pool designed to satisfy the aforementioned needs. The invention incorporates a unique combination of concepts for achieving moisture control and energy conservation in the same system. First, a smaller inner dome or enclosure is installed over the humid environment and inside of the large outer enclosure ordinarily housing the environment. In conjunction with this, a differential fan operated heat exchanger is connected to the inner enclosure. The inner enclosure is maintained at a negative atmospheric pressure via the exhaust fan of the heat exchanger, and provides a moisture barrier which constrains evaporating moisture mostly to the interior of the inner enclosure. Second, a positive atmospheric pressure is maintained in the space between the inner and outer enclosures via the incoming fan of the heat exchanger at a level which is greater than that within the inner enclosure above the humid environment. This plus the barrier provided by the inner enclosure ensures that almost no moisture can escape the inner enclosure to cause condensation on the interior surfaces of the outer enclosure. Thus, condensation and mildew problems associated with conventional humid environments, such as indoor pool designs are kept to a minimum. This translates into less building maintenance and deterioration. Also, vapor that condenses on the interior of the heat ecxhanger gives up its sizable latent heat to the incoming air which is used to heat the air in the space between the enclosures thereby conserving energy. Also, the air space between the inner and outer enclosures provides a natural barrier which insulates the humid environment from the cooler ambient atmosphere outside the outer enclosure.

Accordingly, the present invention sets forth in combination with a humid environment, such as a heated pool, and an outer enclosure housing the environment, an improved interdome enclosure system which comprises: (a) an inner enclosure disposed within the outer enclosure and over the humid environment, the inner and outer enclosures defining a space therebetween; and (b) means creating an atmospheric pressure within the space between the inner and outer enclosures which is positive relative to the atmospheric pressure within the inner enclosure. More particularly, the positive pressure creating means includes first means for exhausting moisture-laden air from within the inner enclosure and second means for introducing fresh dry ambient air into the space between the outer and inner enclosures. The first and second means includes conduits which define separate flow paths for the exhaust air and fresh air and place them in heat exchange relationship to one another. The conduit defining the flow path for the exhaust air also provides for return flow of condensation of vapor contained in the exhaust air back to the inner enclosure.

These and other advantages and attainments of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the course of the following detailed description, reference will be made to the attached drawings in which:

FIG. 1 is a transverse vertical sectional view, taken along line 1—1 of FIG. 2, of an interdome enclosure system for a heated indoor pool which incorporates the principles of the present invention.

FIG. 3 is an enlarged fragmentary sectional view of the air heat exchanger incorporated by the system as seen in FIG. 2, showing the portion of the heat exchanger where condensation is drained back into the pool.

FIG. 4 is an enlarged fragmentary sectional view of the air inlet and outlet ends of the heat exchanger of the system as seen in FIG. 2.

DETAILED DESCRIPTION OF THE INVENTION

Figure 2:
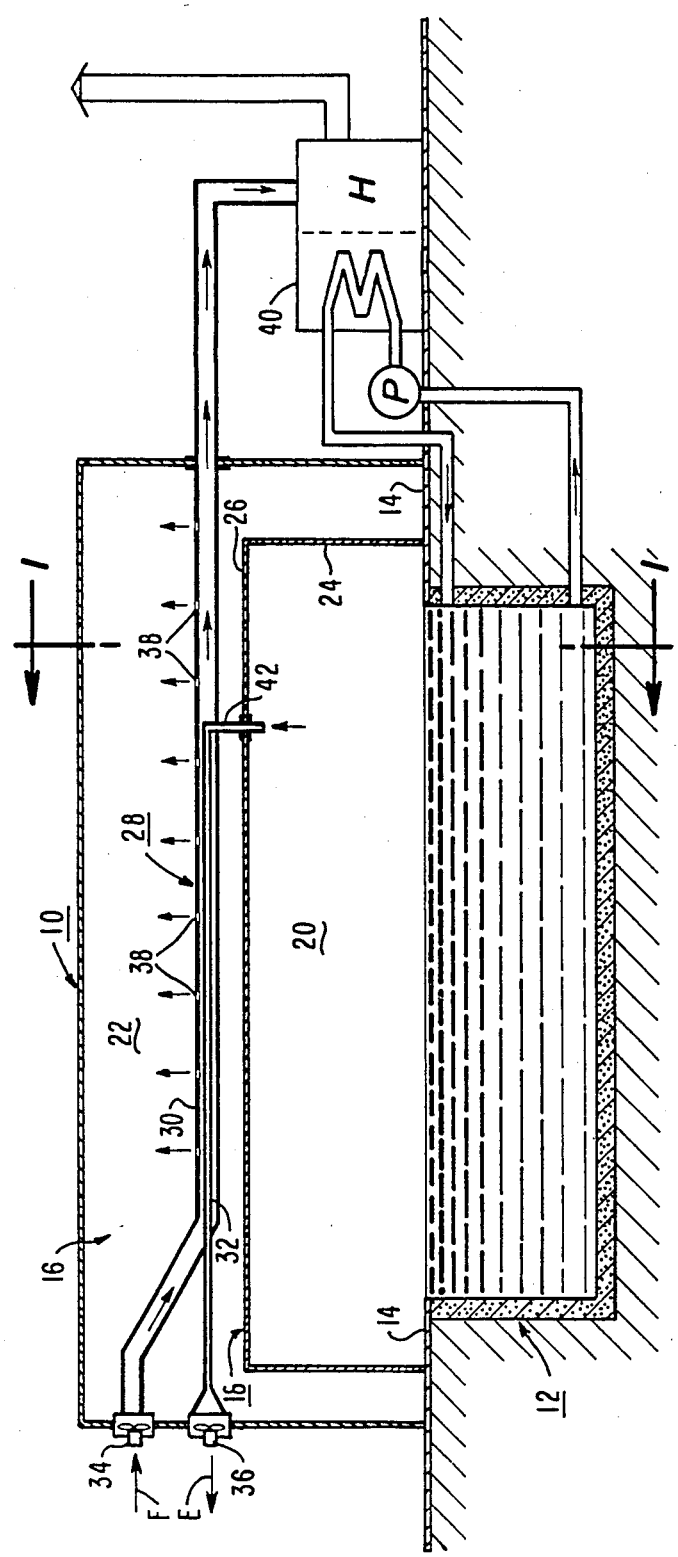
FIG. 2 is a longitudinal sectional view of the enclosure system as taken along line 2—2 of FIG. 1.

In the following description, like reference characters designate like or corresponding parts throughout the several views of the drawings. Also, in such terms as "forward", "rearward", "left", "right", "upwardly", "downwardly", and the like, are words of convenience and are not to be construed as limiting terms.

In General

Referring now to the drawings, and particularly to FIGS. 1 and 2, there is shown, in schematic form, a building 10 housing a heated indoor swimming pool 12, both of which are conventional in construction. Also, in most conventional indoor pool installations, a deck or platform 14 extends between the perimeters of the pool 12 and the building 10 and covers an area of substantial size surrounding the pool 12. Further, FIGS. 1 and 2 schematically depict, in combination with the building 10 and pool 12, the interdome enclosure system of the present invention, being generally designated by the numeral 16. Also, set forth in the figure is an example of the relative values of temperature (T), humidity (H) and relative atmospheric pressure (P) which can be obtained by employment of the interdome enclosure system 16. Hereafter, to facilitate an understanding of the subject matter constituting the interdome enclosure system 16 of the present invention, the building 10 will be referred to as an outer enclosure 10.

While the present invention is being illustrated and described in combination with a heated indoor swimming pool, it should be understood that the invention is equally applicable to other humid environments, such as a greenhouse.

Interdome Enclosure System

The interdome enclosure system 16 basically includes an inner enclosure 18 disposed over the pool 12 so as to define an inner chamber or space 20 above, and about the perimeter of, the pool 12 and an outer chamber or space 22 above the platform 14 and between the outer and inner enclosures 10,18. Generally, the outer space 22 will be of substantially larger volume than the inner space 20. However, the inner space 20 must be large enough to allow sufficient room to accommodate normal human activity about a swimming pool. The inner enclosure 18 can be erected inexpensively by interconnecting plastic tubing into a generally rectangular frame 24 supported, for instance, either from the ceiling of the outer enclosure 10 or the platform 14 and by enveloping a cover 26 of clear plastic sheet material over the frame in tent-like fashion which denotes that the cover 26 is disposed about its bottom perimeter in a non-sealing or non-airtight relationship with the platform 14 and thereby with the humid environment of the pool 12. Such relationship between the exterior and interior of the inner enclosure 18, or between the outer and inner spaces 22,20. The plastic cover 26 which provides a moisture barrier may, for example, be 0.020 inch clear vinyl sheet material of the type used for awnings. The frame 24 may be constructed from suitable materials, such as ⅜ inch PVC water line tubing.

Also, the interdome enclosure system 16 includes means, generally designated 28, for creating an atmospheric pressure within the outer space 22 which is positive relative to the atmospheric pressure within the inner space 20 and to the atmospheric pressure outside of the outer enclosure 10. As more clearly seen in FIGS. 2 through 4, the pressure-creating means 28 takes the form of first and second conduits 30,32 and first and second fans 34,36.

The first conduit 30 provides communication between the fresh, generally dry air of the atmosphere outside of the outer enclosure 10 and the atmosphere within the outer space 22 between the outer and inner enclosures 10,18. The first, inlet fan 34 is disposed in communication with the conduit 30 and is operable to direct or pull fresh air from outside of the outer enclosure 10 into the outer space 22 between the inner enclosure 18 and outer enclosure 10. For instance, the conduit 30 might supply fresh air both into the outer space 22 through openings 38 in the first conduit 30 and to a furnace 40 disposed within the outer space 22 which is used to heat the same and/or the water from the pool 12, such as seen in FIG. 2.

The second conduit 32 provides communication between the humid air of the atmosphere in the inner enclosure space 20 above the pool 12 and the external atmosphere outside of the outer enclosure 10. The second, exhaust fan 36 is disposed in communication with the second conduit 32 and is operable to direct or pull humid air from the inner space 20 within the inner structure 18 to the external atmosphere outside of the outer enclosure 10. An additional benefit from the exhaust of the humid air from the inner space 20 is that chemicals in the air above the pool which tend to irritate the eyes and lungs of the pool users are also removed.

Thus, the first and second conduits 30,32 define separate flow paths for the fresh air from the external atmosphere into the outer space 22 and for the exhaust air from the inner space 20 into the external atmosphere. Furthermore, the first conduit 30, being larger in diameter than the second conduit 32, is preferably disposed in concentric relation about, and coaxial relation with, the second conduit 32, as seen in FIGS. 3 and 4, so as to provide the separate flow paths in an air heat exchange relationship. For example, the first conduit 30 might have a six inch diameter, while the second conduit 32 might have a four inch diameter. The fresh air inlet flow path F is generally annular in shape, being defined within the outer, first conduit 30 and about the exterior of the inner, second conduit 32. The humid air exhaust flow path E is generally cylindrical in shape, being defined within the inner, second conduit 32. Since the fresh air flowing from the exterior atmosphere along the inlet flow path F in the first conduit 30 is cooler and dryer than the humid air flowing from the inner space 20 above the pool 12 along the exhaust flow path E in the second conduit 32, heat is conducted through the wall of the second conduit 32 from the hotter exhaust air to the cooler fresh air. As the temperature of the humid exhaust air decreases, the vapor therein is cooled and condenses into liquid form. The second conduit 32 is inclined sufficiently so as to cause the condensation to flow back to the elbow 42, seen in FIGS. 2 and 3, and therefrom back into the pool 12. Additionally, the vapor within the exhaust flow path E in changing from gas to liquid form gives its latent heat to the cooler, dry fresh air within the inlet flow path F.

The rate at which air is moved by the inlet fan 34 is greater than the rate of the exhaust fan 36. As noted in FIG. 1, this differential relationship between the operation of the fans 34,36 results in creation of a positive atmosphere pressure within the outer space 22 and a negative atmospheric pressure within the inner space 20 when the external atmospheric pressure is considered as zero. A positive atmospheric pressure within the outer space 22 compared to the inner space 20 of the inner enclosure 18 ensures that any air flow between the spaces 22,20 is into the inner space 20 of the inner enclosure from the outer space 22 at the exterior of the inner enclosure 18. This ensures that substantially no moisture-laden air can escape from the inner enclosure 18 into the outer space 22 and thus the opportunity for any sweating to occur on the interior walls and ceiling of the outer enclosure 10 is kept to a minimum. Vapor that condenses on the interior of the inner enclosure 18 gives up its latent heat to the atmosphere in the inner space 20 and also through the vinyl cover 26 to the atmosphere in the outer space 22 thereby conserving heat energy needed to independently heat the atmosphere in the outer space 22 between the outer and inner enclosures 10,18. Without the inner enclosure 18 and the maintenance of the positive pressure in the outer area 22, vapor from the inner space 20 above the pool 12 would seek the drier atmosphere of the outer space 20 and condense on the cooler walls, windows and ceiling of the outer enclosure 10. Also, the latent heat of condensation would be lost through the outer enclosure 10 to the external atmosphere. Furthermore, maintenance of the positive atmospheric pressure within the outer space 22 relative to atmospheric pressure within the inner space 20 of the inner enclosure 18, together with the non-sealing or non-airtight relationship of the bottom perimeter of the cover 26 of the inner enclosure 18 with the platform 14 and humid environment, ensures that replenishment of air within the interior or inner space 20 of the inner enclosure 18, as the moisture-laden air is being within drawn by the exhaust fan 36, will be by fresh ambient air from the outer space 22 or exterior of the inner enclosure flowing into the inner space 20 or interior thereof substantially at the bottom perimeter of the cover 26.

It is thought that the interdome enclosure system of the present invention and many of its attendant advantages will be understood from the foregoing description and it will be apparent that various changes may be made in the form, construction and arrangement of the parts thereof without departing from the spirit and scope of the invention or sacrificing all of its material advantages, the form hereinbefore described being merely a preferred or exemplary embodiment thereof.

What is claimed is:

1. An interdome enclosure system in combination with a heated swimming pool and an outer enclosure housing the swimming pool, said system comprising:
   (a) an inner enclosure composed of a material providing a moisture barrier and being disposed within said outer enclosure and over said swimming pool in a non-sealing relationship therewith which allows communication of air between the exterior and interior of said inner enclosure, said inner and outer enclosures defining a space therebetween; and
   (b) means creating an atmospheric pressure within said space which is positive relative to the atmospheric pressure within said inner enclosure to ensure that any air flow between the exterior and interior of said inner enclosure is into the interior of said inner enclosure from said space at the exterior of said inner enclosure so as to substantially prevent escape of moisture-laden air from said inner enclosure to said space, said positive pressure creating means including
   (i) first means which includes a first conduit extending through said space between said inner and outer enclosures and interconnecting said enclosures for exhausting moisture-laden air from within said inner enclosure to the exterior of said outer enclosure without communicating with the atmosphere within said space between said inner and outer enclosures and a first fan communicating with said first conduit and operable to direct flow of moisture-laden air from said inner enclosure above said swimming pool to said atmosphere external to said outer enclosure, and
   (ii) second means which includes a second conduit and a second fan for introducing fresh ambient air from the exterior of said outer enclosure into said space between said inner and outer enclosures, said second conduit being connected to said outer enclosure and extending into said space between said inner and outer enclosures for communicating said atmosphere of said space with said atmosphere external to said outer enclosure, said second fan communicating with said second conduit and operable to direct flow of fresh air from said atmosphere external to said outer enclosure into said space between said outer and inner enclosures,
   (iii) said first and second conduits defining separate flow paths for said moisture-laden and fresh air and said second fan providing a higher volume flow rate than said first fan to create said positive atmospheric pressure within said space and said first fan providing a negative atmospheric pressure within said inner enclosure relative to an external atmospheric pressure outside of said outer enclosure when said external atmospheric pressure is considered to be at zero,
   (c) said positive atmospheric pressure within said space relative to atmospheric pressure within said inner enclosure together with said non-sealing relationship of said inner enclosure with said swimming pool ensuring replenishment of air within the interior of said inner enclosure by fresh ambient air from said space between said inner and outer enclosures.

2. The interdome enclosure system as recited in claim 1, wherein said inner enclosure includes a frame erected over and about said swimming pool and a cover enveloping said frame and being composed of said material forming said moisture barrier, said cover being disposed in said non-sealing relationship with said swimming pool.

3. The interdome enclosure system as recited in claim 1, wherein said first and second conduits are disposed in relation to one another so as to place their respective flow paths in a heat exchange relationship.

4. The interdome enclosure system as recited in claim 3, wherein said first conduit which defines said flow path for said exhaust air also provides for return flow of condensation of vapor contained in said exhaust air back to said inner enclosure.

5. The interdome enclosure system as recited in claim 3, wherein said second conduit is larger in diameter than said first conduit and is disposed in concentric relation about, and coaxial relation with, said first conduit so as to provide said separate flow paths in said heat exchange relationship.

6. An interdome enclosure system in combination with a heated swimming pool and an outer enclosure housing the swimming pool, said system comprising:
(a) an inner enclosure disposed within said outer enclosure and over said swimming pool, said inner and outer enclosures defining a space therebetween; and
(b) means creating an atmospheric pressure with said space which is positive relative to the atmospheric pressure within said inner enclosure by removing air from said inner enclosure at a faster rate than air is replenished to said inner enclosure, said positive pressure creating means including a first conduit communicating said atmosphere of said space with the atmosphere external to said outer enclosure, a first fan communicating with said first conduit and operable to direct flow of fresh air from said atmosphere into said space between said outer and inner enclosures, a second conduit communicating said atmosphere within said inner enclosure with the atmosphere external to said outer enclosure, and a second fan communicating with said second conduit and operable to direct flow of humid air from said inner enclosure above said swimming pool to said atmosphere external to said outer enclosure, said second fan providing a higher volume flow rate than said first fan to create said positive atmospheric pressure within said space and said first fan providing a negative atmospheric pressure within said inner enclosure relative to an external atmospheric pressure outside of said outer enclosure when said external pressure is considered to be at zero.

7. The interdome enclosure system as recited in claim 6, wherein said inner enclosure includes a frame erected over and about said swimming pool and a cover enveloping said frame and forming a moisture barrier.

8. The interdome enclosure system as recited in claim 6, wherein said first and second conduits define separate flow paths for said fresh inlet air and said exhaust air.

9. The interdome enclosure system as recited in claim 8, wherein said first and second conduits are disposed in relation to one another so as to place their respective flow paths in a heat exchange relationship.

10. The interdome enclosure system as recited in claim 9, wherein said first conduit which defines said flow path for said exhaust air also provides for return flow of condensation of vapor contained in said exhaust air back to said inner enclosure.

* * * * *